(12) United States Patent
Schroeder et al.

(10) Patent No.: US 9,851,765 B1
(45) Date of Patent: Dec. 26, 2017

(54) DATA STORAGE ENCLOSURE WITH A STOP SLOT

(71) Applicant: Seagate Technology LLC, Cupertino, CA (US)

(72) Inventors: Christopher E. Schroeder, Erie, CO (US); Kevin Van Pelt, Longmont, CO (US); Charles P. Morris, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/188,542

(22) Filed: Jun. 21, 2016

(51) Int. Cl.
*G06F 1/16* (2006.01)
*H05K 7/16* (2006.01)
*G06F 1/18* (2006.01)
*G06F 1/20* (2006.01)

(52) U.S. Cl.
CPC .............. *G06F 1/187* (2013.01); *G06F 1/181* (2013.01); *G06F 1/20* (2013.01)

(58) Field of Classification Search
CPC ................................. G06F 1/187; G06F 1/181
USPC .......... 361/679.31–679.39, 724–727; 211/26
See application file for complete search history.

(56) References Cited

U.S. PATENT DOCUMENTS

| | | | | |
|---|---|---|---|---|
| 5,587,854 | A * | 12/1996 | Sato | G11B 33/08 360/97.11 |
| 6,185,097 | B1 * | 2/2001 | Behl | G06F 1/20 361/695 |
| 6,487,081 | B2 * | 11/2002 | Homer | G11B 33/08 312/223.2 |
| 7,483,268 | B1 * | 1/2009 | King, Jr. | G06F 1/187 248/682 |
| 8,215,727 | B2 | 7/2012 | Barrall et al. | |
| 8,654,525 | B2 | 2/2014 | Bondurant et al. | |
| 8,717,460 | B2 | 5/2014 | Zhang et al. | |
| 2010/0271773 | A1 * | 10/2010 | Ye | G11B 33/128 361/679.33 |
| 2014/0104780 | A1 * | 4/2014 | Terwilliger | G11B 33/12 361/679.37 |
| 2014/0209548 | A1 * | 7/2014 | Lo | G06F 1/187 211/59.4 |
| 2014/0211423 | A1 | 7/2014 | Nguyen et al. | |
| 2014/0240908 | A1 * | 8/2014 | Kwon | G06F 1/183 361/679.02 |

\* cited by examiner

*Primary Examiner* — Nidhi Thaker
(74) *Attorney, Agent, or Firm* — Hall Estill Attorneys at Law

(57) ABSTRACT

A data storage enclosure can have one or more data storage devices positioned in an enclosure slot having one or more stops. A data storage device can be attached to a rail having a rail width and having first and second protrusions offset from one another. The first and second protrusions may each have protrusion widths that are less than the rail width with the second protrusion shaped to provide a positive stop that retains the rail in an enclosure slot.

20 Claims, 7 Drawing Sheets

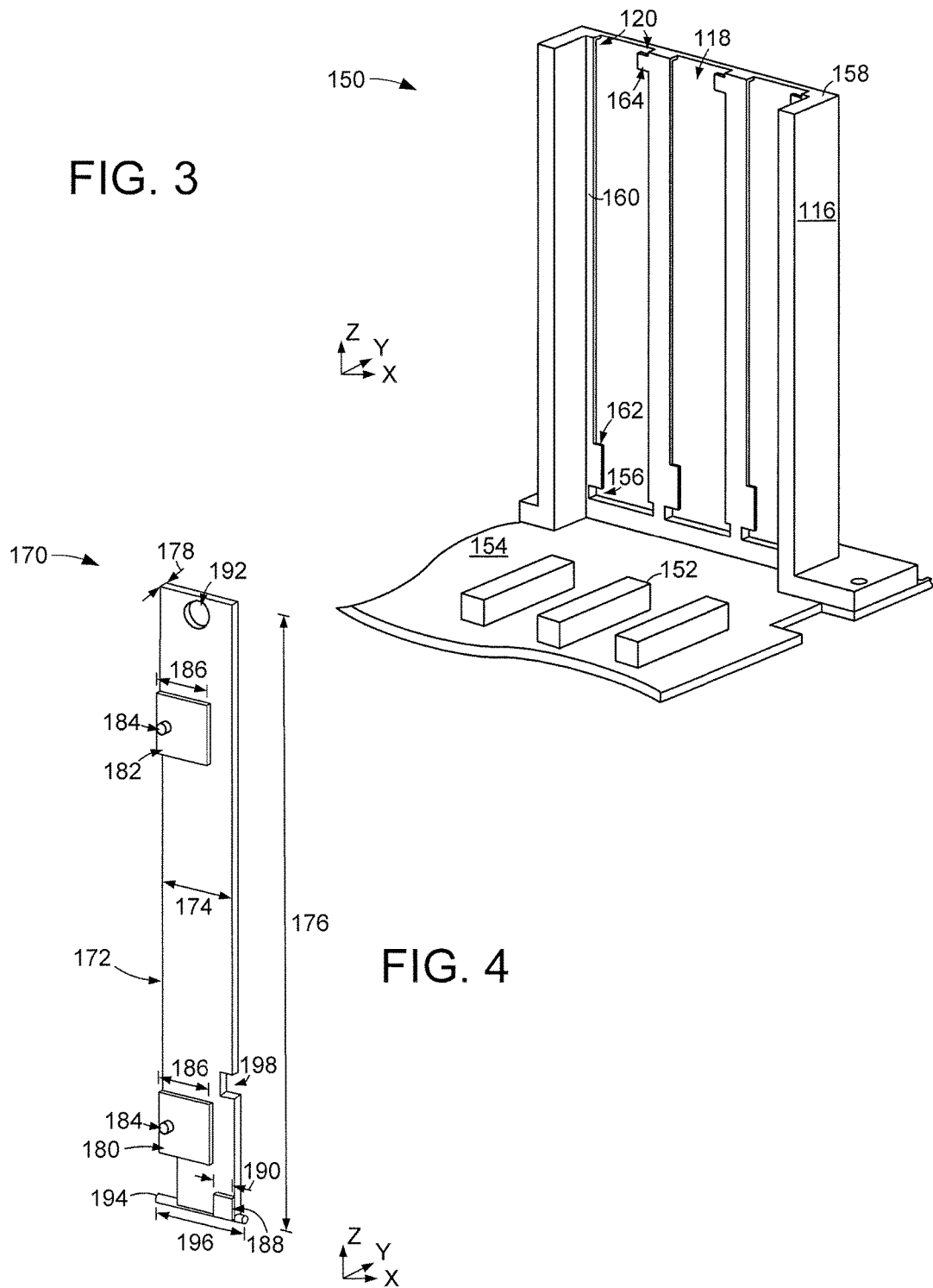

DATA STORAGE ENCLOSURE WITH A STOP SLOT

SUMMARY

A data storage enclosure, in some embodiments, has one or more data storage devices positioned in an enclosure slot having one or more stops. A data storage device can be attached to a rail having a rail width and having first and second protrusions offset from one another. The first and second protrusions each have widths that are less than the rail width with the second protrusion shaped to provide a positive stop that retains the rail in an enclosure slot.

BRIEF DESCRIPTION OF THE DRAWINGS

FIG. 3 displays a portion of an example data storage enclosure configured in accordance with some embodiments.

FIG. 4 illustrates of a portion of an example data storage enclosure arranged in accordance with assorted embodiments.

DETAILED DESCRIPTION

Figure 1:
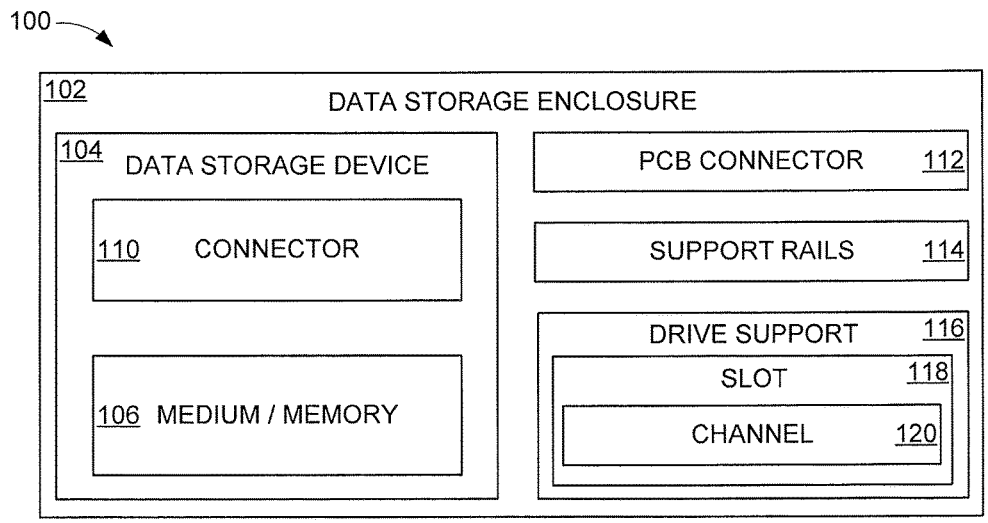
FIG. 1 is a block representation of an example data storage system arranged in accordance with various embodiments.

Various embodiments of the present disclosure are directed to a data storage enclosure that secures at least one data storage device within a slot with one or more positive stops. It is noted that the term "data storage enclosure" is meant as a structure that houses and electrically connects multiple separate data storage devices into at least one circuit board. The term "data storage device" is meant as a component, or assembly of components, capable of storing data. As a non-limiting example, a data storage device may comprise a non-volatile rotating medium hard disk drive and/or a cooling assembly that controls the temperature of a data storage enclosure and/or a non-volatile memory, such as a solid state memory array, hybrid memory, or hard disk drive.

With data being generated and transferred at ever increasing rates, industry, as well as consumers, are emphasizing the amount of data capacity available. Numerous data storage devices can be housed in a common data storage enclosure to provide a data capacity that is the aggregate of the various data storage devices. In yet, physically positioning multiple data storage devices in a common data storage enclosure can pose vibration, density, cooling, electrical connection, and device interchangeability difficulties. Conventionally, a data storage device is attached to a device carrier that addresses such difficulties. However, a device carrier is an additional part that increases the monetary cost of a data storage enclosure as well as the time cost and complexity of installing and changing device carriers, which also introduces the risk of improperly connecting a device carrier to a data storage device.

Accordingly, a data storage enclosure, in accordance with various embodiments, has an enclosure slot in which a rail is positioned to slide between protrusions and ensure reliable and safe electrical connection between a data storage device and an enclosure circuit board. The rail can be arranged with a rail width along with first and second protrusions that are offset from one another. The first and second protrusions each have widths that are less than the rail width and the second protrusion is shaped to provide a positive stop that retains the rail in the enclosure slot. The ability to securely form an electrical connection with the enclosure slot and rail can eliminate a device carrier to increase the interchangeability of devices in a data storage enclosure.

The term "carrier" is meant as a component, or assembly of components, that are physically attached to a data storage device and are removed with the data storage device when the device is uninstalled from a data storage enclosure. In contrast, the slot and rail configuration provided in assorted embodiments can be characterized as "carrierless" due to each rail remaining in a slot when a data storage device is removed from a data storage enclosure. For instance, a carrier is a separate component from the data storage enclosure and is attached to a data storage device prior to installation in a data storage enclosure while a rail, in the current embodiments, remains in the enclosure slot with, or without, a data storage device attached, which is ensured by at least one positive stop preventing removal of a rail from a slot.

FIG. 1 is a block representation of an example data storage system 100 in which any number of data storage enclosures 102 can be employed. It is contemplated that the data storage system is a rack that concurrently holds multiple data storage enclosures 102 as part of a data center, cloud computing node, or network server. The data storage enclosure can house a plurality of data storage devices 104 that operate individually and concurrently to provide a larger data capacity to a system host than the individual data storage devices.

While any type of data storage device 104 can be positioned in the data storage enclosure 102, it is contemplated that at least one device 104 can be a rotating magnetic medium or memory 106 on which data is stored, and retrieved. Each data storage device 104 has at least one connector, such as a serial interface, that establishes an electrical connection with a printed circuit board (PCB) connector 112 of the data storage enclosure 102. In some embodiments, the PCB connector 112 is one of many electrical pathways and components on a common enclosure circuit board such that each data storage device 104 is physically attached to the circuit board and form electrical connections to a controller, or processor, of the enclosure circuit board.

Each data storage device 104 may be physically connected to one or more support rails 114 that are secured in a drive support 116 structure. It is contemplated that a drive support 116 is physically attached to an enclosure circuit board, such as with fasteners, adhesive, or combinations thereof. A drive support 116 may be configured with any number of device slots 118 that are sized to house a single data storage device 104. For example, a device slot 118 can have a width that approximately matches the width of a single data storage device 104 and allows the support rails 114 to slidingly move within channels 120 to allow movement of the data storage device 104 relative to an enclosure circuit board.

Figure 2A:
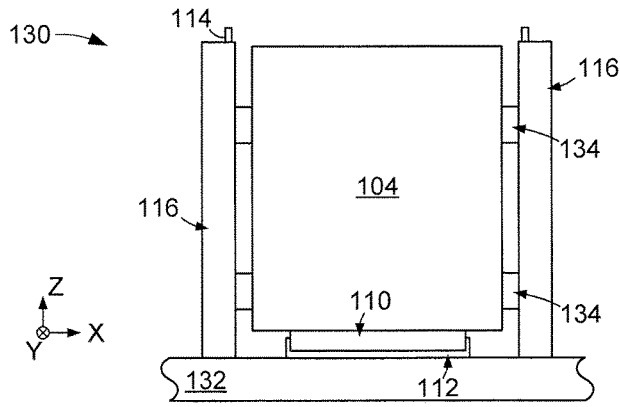
FIGS. 2A and 2B respective show portions of an example data storage enclosure capable of being used in the data storage system of FIG. 1.
Figure 2B:
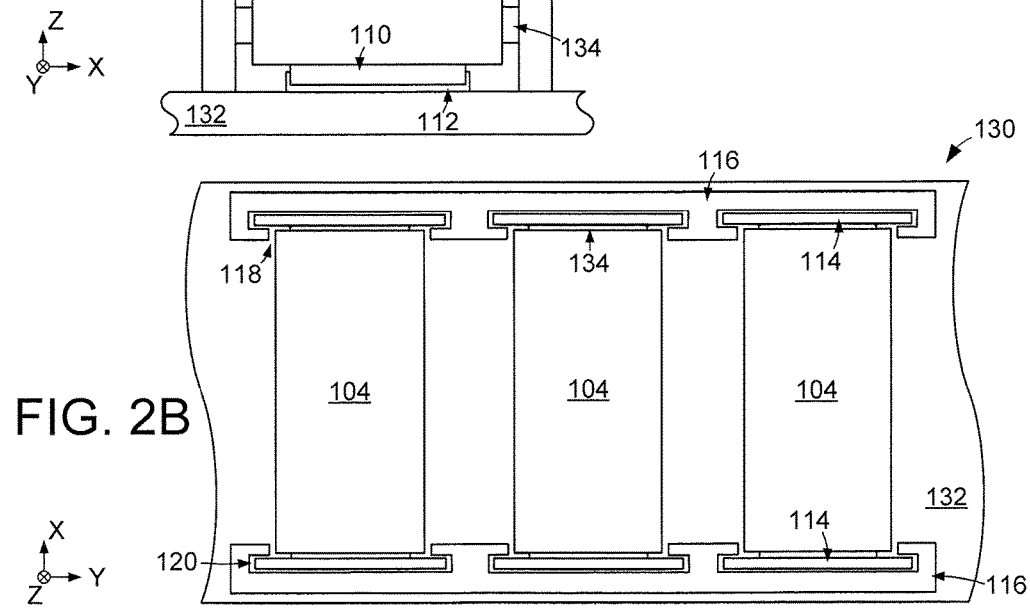

FIGS. 2A and 2B respectively illustrate line representations of portions of an example data storage enclosure 130 that may be incorporated into the data storage system 100 of FIG. 1 in accordance with some embodiments. The side view of FIG. 2A shows how a data storage device 104 fit between drive supports 116 that respectively extend from an enclosure substrate 132, which may be a circuit board or rigid portion of an enclosure frame. Each drive support 116 houses a support rail 114 that provides multiple protrusions 134 to physically attach to the data storage device 104, such as predetermined fastener apertures in the data storage device 104.

The respective support rails 114 are shown extending above the drive supports 116 in FIG. 2A, but such configuration is not limiting and is intended to convey how the rails 114 can slidingly move up and down along the Z axis to engage, and disengage a device connector 110 with a PCB connector 112. The top view of FIG. 2B shows how the drive support 116 can continuously extend along the X-Y plane to provide multiple separate slots 118 that are occupied by support rails 114. The configuration of the respective slots 118 allows the support rails 114 to move vertically, along the Z axis, while being restrained horizontally, in the X-Y plane.

It is contemplated that the drive supports 116 can position the data storage devices 104 in a horizontal orientation where the movement of the rails 114 is perpendicular, or angled, with respect to gravity. However, such horizontal orientation can be unreliable due to gravity acting against the electrical connection of the connectors 110 and 112 as well as against the movement of the rails 114. In contrast, the vertical orientation of the data storage devices 104 shown in FIGS. 2A and 2B allows gravity to act parallel with the movement of the rails 114 to promote and maintain the physical connection of the connectors 110 and 112, which optimizes the reliability and performance of the data storage enclosure 130.

While vertical orientation of the data storage devices 104 can allow the support rails 114 to replace a device carrier and promote secure electrical connection, the fact gravity constantly forces the rails 114 towards the PCB connector 112 can result in inadvertent damage to the respective connectors 110 and 112 as well as the data storage device 104 itself. Hence, various embodiments configure the data storage enclosure 130 with at least one positive stop that prevents unwanted movement of the rails 114 and data storage device 104.

In some embodiments, the data storage enclosure 130 houses and employs multiple different devices in the drive support 116. While each data storage device 104 shown in FIG. 2B can be a component that stores data magnetically, at least one device may be configured to cool the enclosure 130 and adjacent data storage devices 104. As a non-limiting example, a cooling device, such as a fan, liquid cooling tubes, or heat sink, can be attached between support rails 114 and positioned in the drive support 116 with at least one electrical connection to the enclosure circuit board that supplies power and control to a local and/or remote enclosure host.

FIGS. 3-8 respectively illustrate assorted aspects of an example data storage enclosure 150 that vertically orients and electrically connects one or more data storage devices 104 with a connector 152 extending from an enclosure circuit board 154 in accordance with various embodiments. FIG. 3 displays an example drive support 116 that can be concurrently occupied by three data storage devices. It is noted that the drive support 116 can be configured with more, or less, than the three slots 118 shown in FIG. 3 and the support 116 is one of a pair of drive supports 116 that simultaneously act on opposite sides of at least one data storage device 104, as generally illustrated in FIG. 2B.

The perspective view of FIG. 3 shows how each slot 118 has a channel 120 that continuously extends from an entrance region 156, proximal the enclosure substrate 154, to a location proximal a top surface 158 of the drive support 116. The separation of the channel 120 from the top surface 158 and a front surface 160 of the drive support 116, except for the entrance region 156, isolates movement of a support rail in the X-Y plane while allowing free movement along the Z axis. Each slot 118 has first 162 and second 164 tabs that provide positive stops to prevent unwanted vertical movement of a support rail along the Z axis. The respective tabs 162 and 164 further serve to guide support rail vertical movement and prevent excess horizontal movement along the X-Y plane.

It is noted that the slot 118 is configured to provide two channel regions on opposite sides of each slot 118. That is, each channel 120 comprises separate channel portions that each extend from the entrance region 156 on the front surface 160 to a position offset from the front 160 and top 158 slot surfaces. The separate channel portions serve to provide multiple features to guide a support rail 116 vertically while preventing the support rail 116 from being removed from channel 120, as discussed below.

FIG. 4 is an example support rail 170 that can be installed in, and removed from, a drive support slot 118 and channel 120. The support rail 170 comprises a planar body 172 that can be characterized as a plate that has a width 174, height 176, and thickness 178. The body 172 may have a uniform or varying thickness 178 from which first 180 and second 182 protrusions extend. Each protrusion 180 and 182 has a capture post 184 that is shaped to engage and secure to a portion of a data storage device. It is contemplated that the capture post be constructed of a different material than the protrusions (180 & 182) and/or body 172 to allow elastic or plastic deformation in response to contact with the data storage device.

The separated position of the protrusions 180 and 182 distributes the connected load of a data storage device and provides increased body thickness 178 along the Y axis that contacts the first tab 162 of a support slot 118 as a positive stop. Each protrusion 180 and 182 has a width 186 that is less than the body width 174 to allow the body 172 a range of movement within a slot channel 120 without contacting the second tab 164. A third protrusion 188 also extends from the rail body 172 and has a width 190 that is less than the body width 174. The position of the third protrusion 188 separated from the first 180 and second 182 protrusions provides a positive stop that prevents the rail 170 from being removed from the slot channel 120 via the application of vertical force due to contact of the third protrusion 188 and the second slot tab 164.

The height 176 of the body 172 can be configured to be equal to, or longer than, a length of a slot channel 120 so that a portion of the body extends above the top surface 158 of the slot 120 when the body 172 is positioned where the bottommost protrusion 180 contacts the first tab 162. The exposed portion of the rail body 172 is configured to present a latch aperture 192 that allows rails on opposite sides of a data storage device to be physically interconnected and secured, which can decrease vibration and shock on the data storage device.

A retention post 194 is cantilevered from the rail body 172 in a direction parallel to the body width 174. As shown, the retention post 194 is cantilevered from the rail body 172 in opposite directions that allows concurrent engagement with the separate channel portions of a slot channel 120. That is, the retention post 194 has a retention width 196 that is greater than the body width 174 so that channel portions on opposite sides of a slot 120 are simultaneously engaged when the rail 170 is inserted in the slot 120 via the entrance region 156.

The shape and size of the retention post 194 allows the rail body 172 to vertically slide in the slot channel 120 while the first 180 and third 188 protrusions provide positive stops that prevent the rail body 172 from sliding too far down, towards the substrate 154, or too far up, towards the top surface 158. The rail body 172 has a notch 198 that can be characterized as an absence of material defined by a reduced body width. The notch 198 is sized to fit around the second slot tab 164 to allow the rail body 172 to rotate behind the second tab 164.

Figure 5:
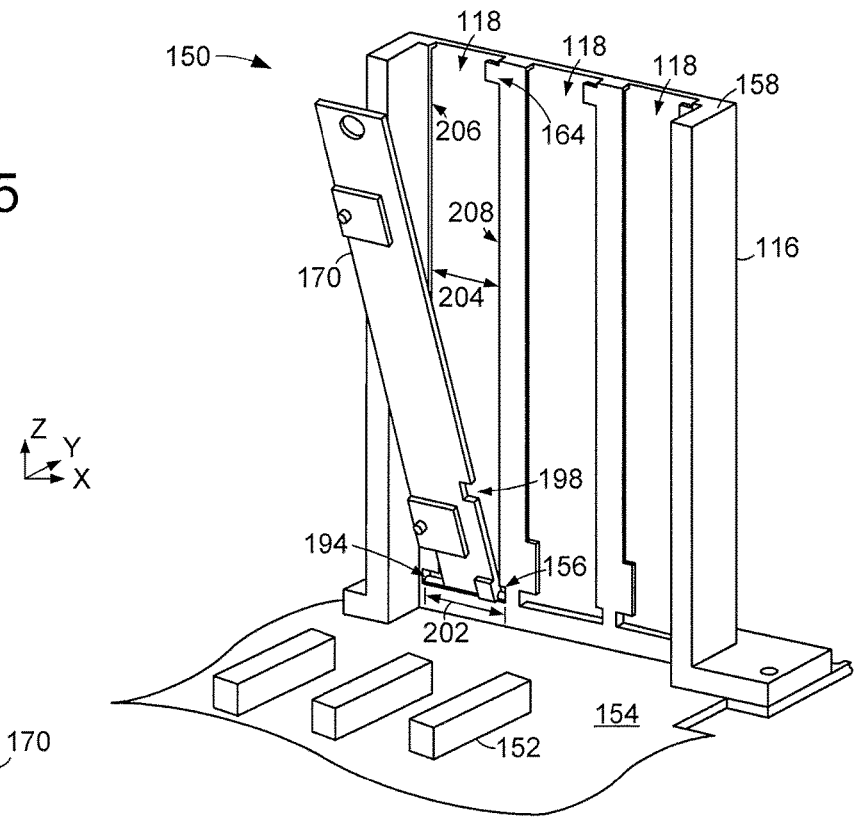
FIG. 5 conveys of a portion of an example data storage enclosure configured in accordance with various embodiments.

FIG. 5 displays how the support rail 170 can engage the channel 120 of a slot 118 of a drive support 116. It is noted that the channel 120 of each slot 118 is not exposed to the top support surface 158 and will not allow the support rail 170 to simply slide into the slot/channel with the rail 170 oriented parallel to the channel 120, along the Z axis. Instead, the support rail 170 is tilted, as shown, to allow the retention post 194 to enter the entrance region 156 of the slot 118. The entrance region 156 has an entrance width 202 that is greater than the slot width 204 proximal the middle of the slot 118 to allow the cantilevered width 196 of the retention post 194 to concurrently engage left 206 and right 208 portions of the channel 120.

With the retention post 194 positioned in the respective channel portions 206 and 208, the support rail 170 cannot fully engage the right portion 208 due to the second tab 164 preventing the support rail 170 from reaching an orientation that is parallel to the channel 118 along the Z-X plane. Accordingly, the support rail 170 is raised, along the Z axis, to a point where the notch 198 aligns with the second tab 164 and the support rail 170 can then be tilted so that the longitudinal axis of the rail 170 is parallel with the Z axis, which corresponds with the support rail 170 fully engaging both portions 206/208 of the channel 120, as shown in FIG. 6.

Figure 6:
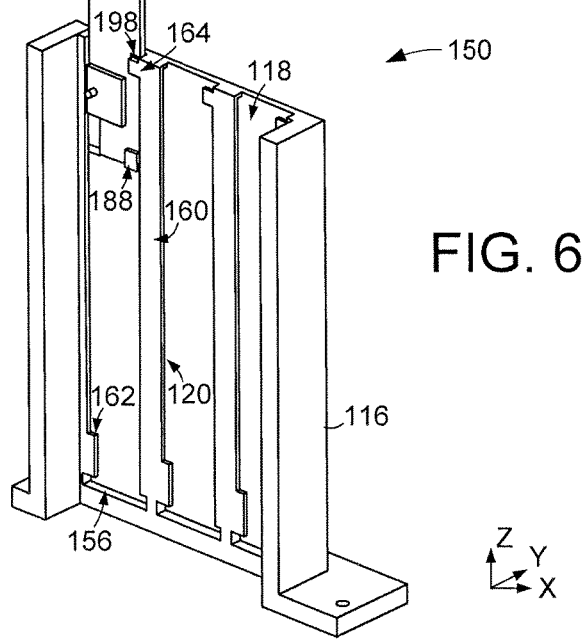
FIG. 6 represents of a portion of an example data storage enclosure arranged in accordance with assorted embodiments.

Further in FIG. 6, the second tab 164 is aligned with the rail notch 198 so that the rail 170 is separated from the front surface 160 of the slot 118. Such separation allows the support rail 170 to efficiently slide downward until the first protrusion 180 contacts the first tab 162 (FIG. 7) and upward until the third protrusion 188 contacts the second tab 164 (FIG. 8). It is noted that the lower positive stop, as defined by the contact of the first protrusion 180 and tab 162, is positioned so that the retention post 194 remains in the right 206 and left 208 portions of the channel 120 above the entrance region 156.

Figure 7:
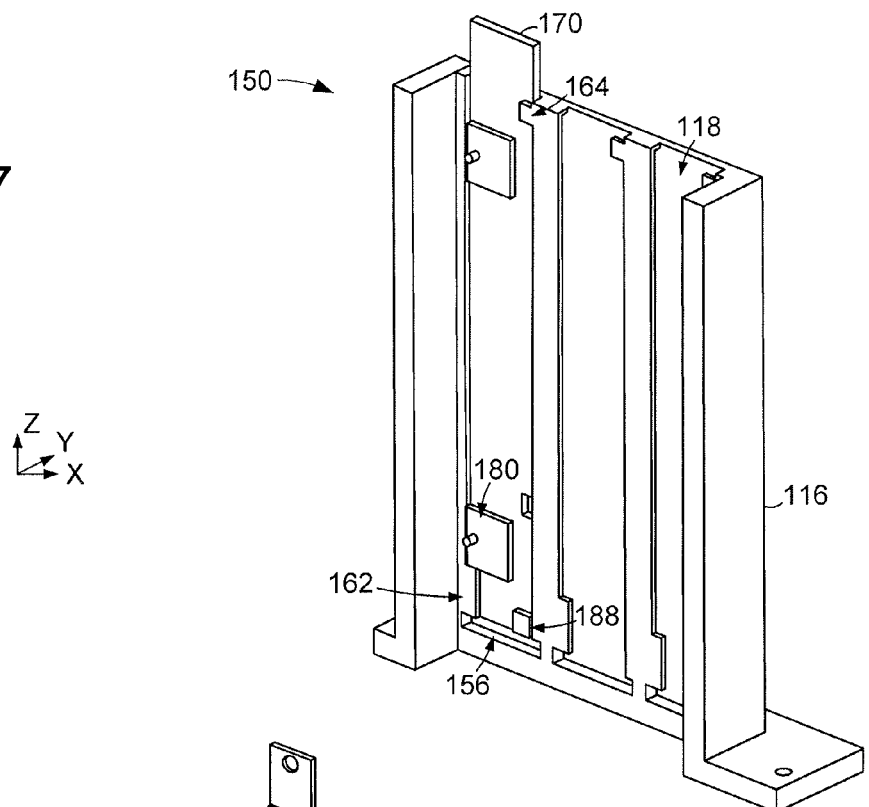
FIG. 7 is a line representation of a portion of an example data storage enclosure configured in accordance with some embodiments.
Figure 8:
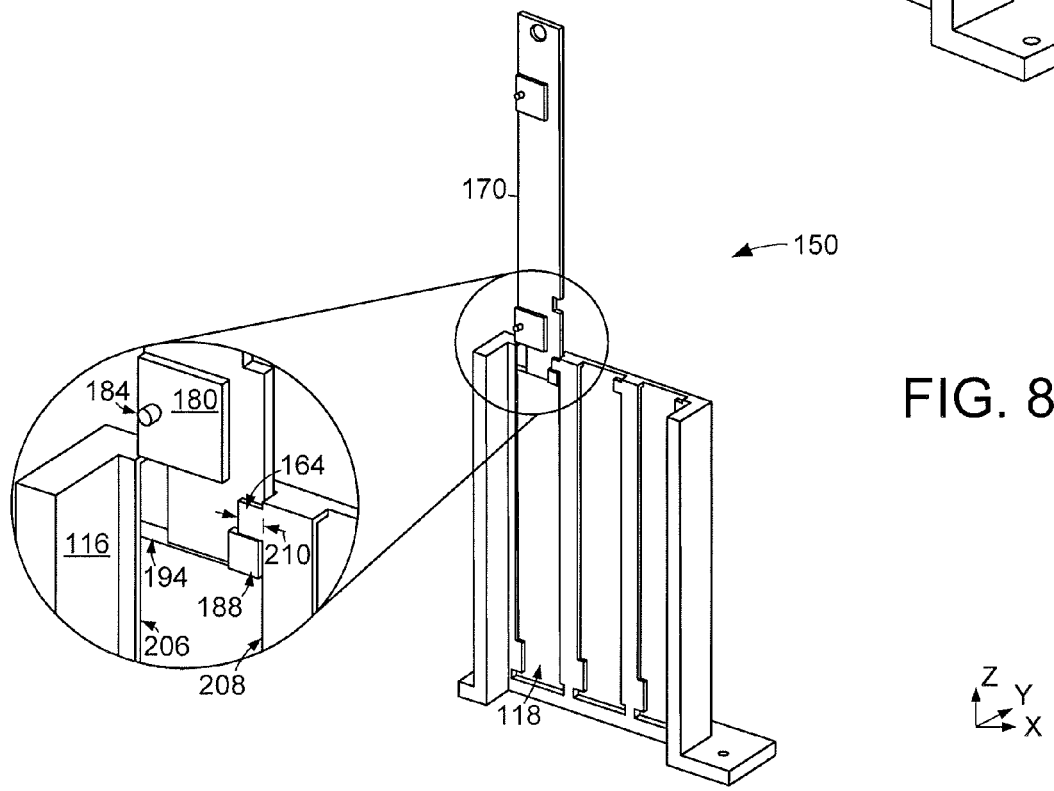
FIG. 8 displays of a portion of an example data storage enclosure arranged in accordance with various embodiments.

That is, the first tab 162 is configured with a height above the entrance region 156 that prevents the retention post 194 from inadvertently exiting the channel 120 when the support rail 170 is in a bottom position relative to the slot 118, as illustrated in FIG. 7. Likewise, the first tab 162 can be configured so that an electrical connector of a data storage device attached to the support rail does not drop beyond a predetermined threshold during installation. For example, the first tab 162 and protrusion 180 can be arranged so that a data storage device can be simply dropped into the slot 118 with the aid of support rails 170 without an electrical connector of the data storage device bottoming out on a PCB connector, which may result in an unsecure connection or damage to either connector.

While the left portion 206 of the channel 120 is not exposed to the top slot surface 158, the second tab 164 provides a positive stop via contact with the third protrusion 188 that prevents the support rail 170 from inadvertently being removed from the channel/slot, as illustrated in FIG. 8. The ability to tune the size and width 210 of the second tab 164 to allow the support rail 170 to slide freely upward and downward in the channel 118 while still providing a top positive stop allows the slot 118 to provide heightened concurrent safety and reliability as the support rail 170 is securely retained in the channel 120 and allowed to vertically slide without concern for over extending and removing the rail 170 from the slot/channel.

Figure 9A:
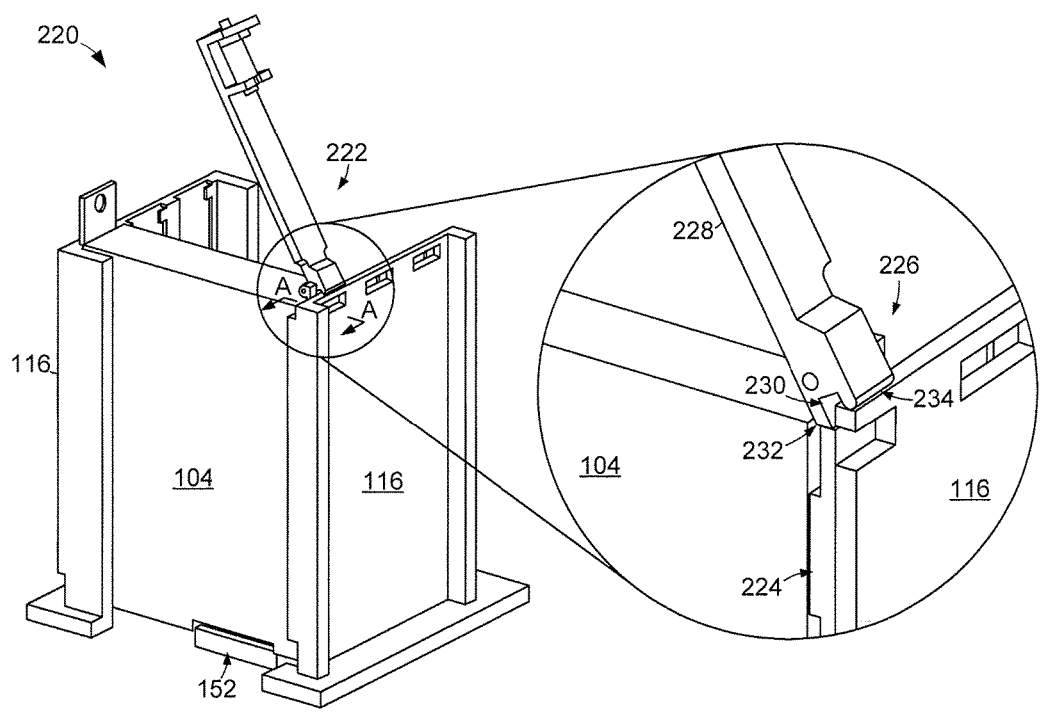
FIGS. 9A and 9B respectively show portions of an example data storage enclosure configured in accordance with some embodiments
Figure 9B:
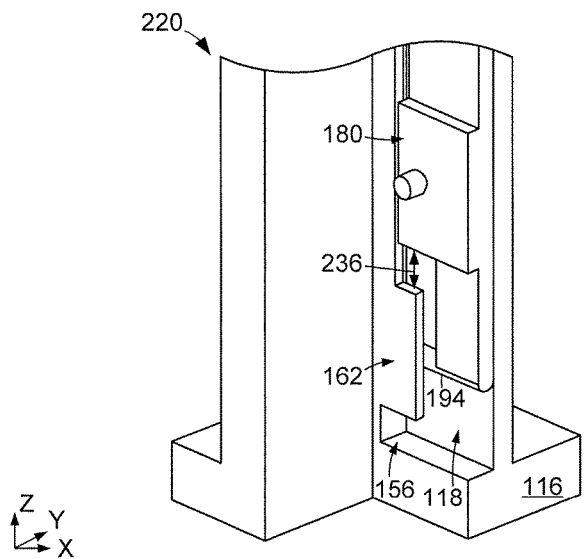

Although support rails 170 positioned on opposite sides of a data storage device can operate as a data storage unit, assorted embodiments provide a latch to engage and physically connect each support rail 170. FIGS. 9A and 9B respectively display different views of an example data storage enclosure 220 that employs a latch assembly 222 that can decrease vibration and shock type trauma to a data storage device while increasing the efficiency and safety of installing a data storage device into a data storage enclosure.

The latch assembly 222 is attached to a first support rail 224 with a hinge 226, which is shown in more detail as a cross-section along A-A. The hinge 226 provides a rotation point for a lever 228 that can be used as a handle to remove, or install, a data storage device 104 into the drive support 116 of a data enclosure. The lever 228 has an end shaped to provide a positive stop for the support rail 224 and data storage device 104. Although the shaped lever end can have a diverse variety of sizes, surfaces, and positions relative to a point of rotation for the hinge 226, the embodiment shown in FIG. 9A illustrates how a groove 230 separates stop 232 and cam 234 surfaces.

The stop surface 232 restricts the rotation of the lever 228 via contact with the first support rail 224. When the lever 228 is rotated so that the stop surface 232 contacts the first support rail 224, the cam surface 234 contacts the drive support 116 to prevent the first support rail 224 and data storage device 104 from advancing downward towards an enclosure circuit board and PCB connector. FIG. 9B conveys how the hinge 226 is configured to position of the first support rail 224 a predetermined separation distance 236 from the first slot tab 162. That is, the groove 230 and cam surface 234 are arranged so that the first protrusion 180 of the first support rail 224 is separated from the first slot tab 162 until the lever 228 is rotated about the cam surface 234.

Figure 10:
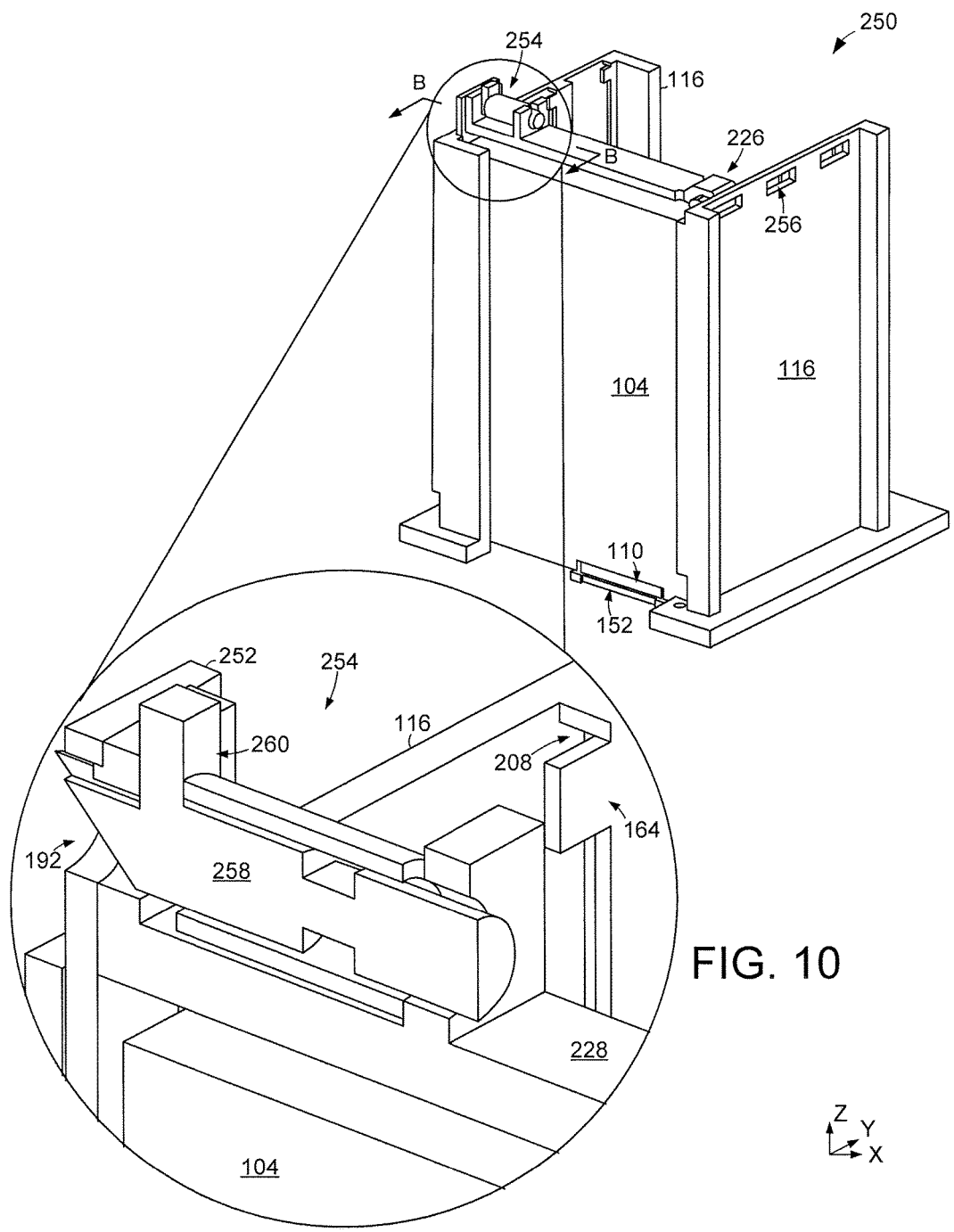
FIG. 10 illustrates of a portion of an example data storage enclosure arranged in accordance with assorted embodiments FIG. 11 provides a flowchart and associated illustrations for an example write pole fabrication routine performed in accordance with various embodiments.

FIG. 10 displays another example data storage system 250 that employs a latch assembly 222 in accordance with assorted embodiments. The lever 228 of the latch assembly 222 rotates around the hinge 226 to physically connect the first support rail 224 with the second support rail 252 via a catch mechanism 254. That is, the catch mechanism 254 portion of the latch assembly 222 is positioned on the lever 228 to engage a latch aperture 192 of the second support rail 252, which secures the respective support rails 224 and 252 together with the data storage device 104.

The hinge 226 acts in concert with the catch mechanism 254 to secure the data storage device 104 in place by positioning the groove 230 on opposite sides of a lock aperture 256 in the drive support. As shown in FIG. 10, rotation of the lever 228 to a position that is perpendicular to a longitudinal axis of the data storage device 104 positions the groove 230 of the hinge 226 so that the stop surface 232 extends through the lock aperture 256 to prevent the support rails 224 and 252 or the data storage device 104 from moving relative to the drive support 116, which ensures a secure electrical connection between the data storage device 104 and the underlying circuit board 154.

In the cross-sectional aspect of FIG. 10 taken from line B-B, the catch mechanism 254 is illustrated with a bolt 258 having a selection tab 260 and extending through the latch aperture 192. The bolt 258 can be shaped to allow any number of pressure means, such as springs or magnets, to maintain the bolt's position in the latch aperture 192. Articulation of the selection tab 260 can rotate and/or translate the bolt 258 out of the latch aperture 192 to allow the lever 228 to rotate upward and the support rails 224 and 252 to lift away from the circuit board 154 to disengage electrical contact between the circuit board 154 and the data storage device.

Figure 11:
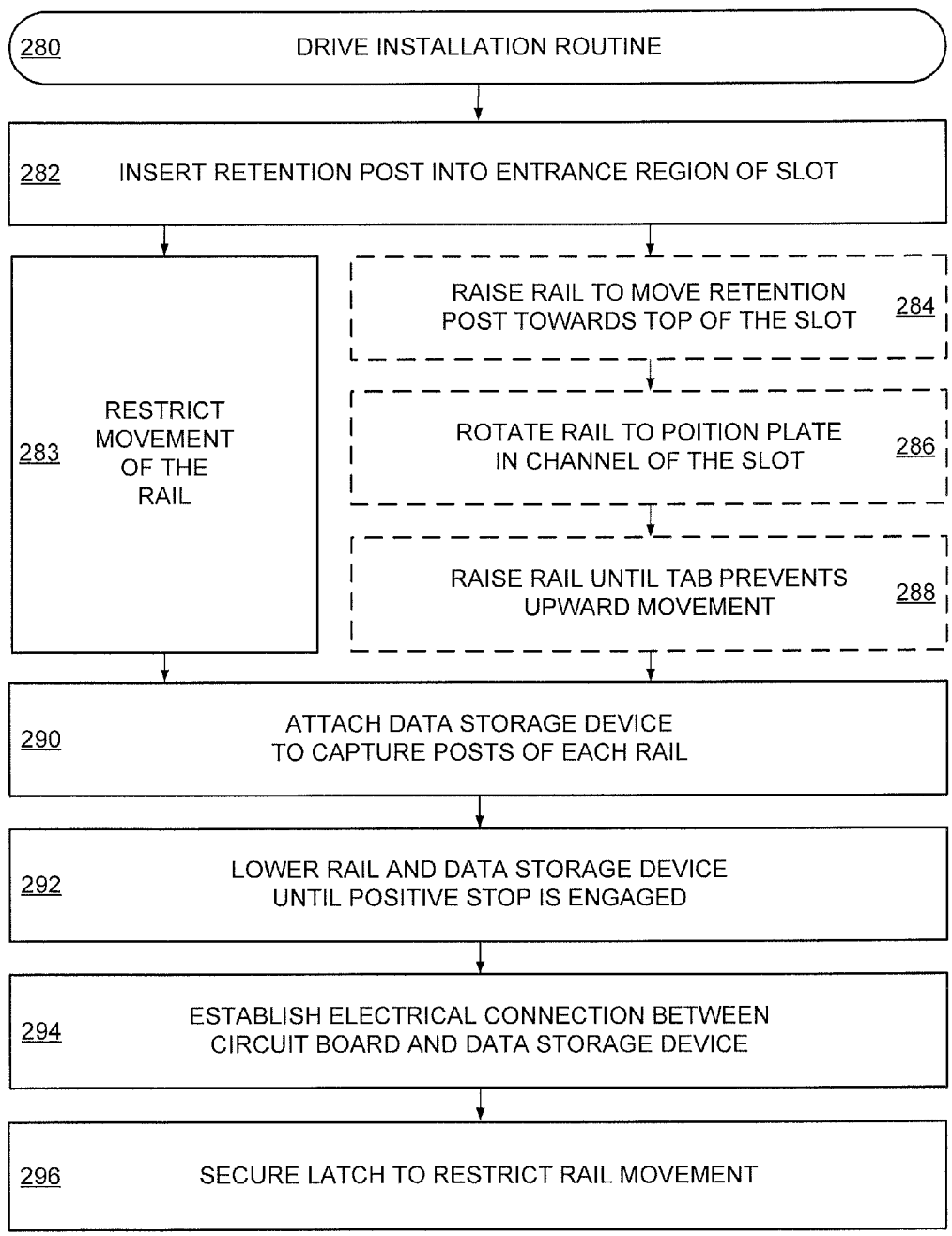

FIG. 11 is a data storage device installation routine 280 that may be carried out with a data storage system of FIGS. 1-10 in accordance with some embodiments. Step 282 inserts a retention post of a first support rail into an entrance region of a slot of a first drive support. It is noted that step 282 may also involve inserting a second support rail into a second drive support to position support rails on opposite sides of a data storage device. Step 283 involves restricting movement of the rail within the enclosure slot with a second protrusion. Additional optional detail steps are shown in dashed line boxes. In some embodiments, one, or more, support rails can be raised in step 284 to move the retention post towards a top surface of the drive support slot within left and right portions of a channel of the slot.

It is noted that step 284 is conducted with only the retention post of each support rail sliding in the channel of the drive support slot. With each support rail raised to a vertical location in the drive support slot where a notch of the rail is aligned with a topmost (second) tab of the slot, step 286 proceeds to rotate the support rail towards the drive support slot so that the notch passes around the topmost tab and the rail is fully within the channel, as shown in FIG. 6. The full engagement of the support rail(s) in the channel of the slot allows the support rail(s) to be vertically raised in step 288 until the topmost tab physically contacts the third protrusion of a rail to act as a positive stop to prevent further upward movement.

Next, step 290 attaches a data storage device to the capture posts of each drive support rail while the rail is proximal the topmost tab of the drive support slot. The secured data storage device is then lowered in step 292 until the lower slot positive stop is engaged, which entails the first slot tab contacting the first protrusion of the support rail. In some embodiments, step 290 is carried out with a latch assembly, such as assembly 222 of FIG. 9A, that provides an additional positive stop prior to the first rail protrusion contacting the first slot tab.

During or after step 292, step 294 establishes at least one electrical connection between the data storage device and a circuit board. Although not required, a latch assembly can be rotated in step 296 to secure the first and second support rails together as a single unit. Step 296 may further involve a catch mechanism engaging a latch aperture of the second support rail, as illustrated in FIG. 10. It is noted that the various steps of routine 280 are not required or limiting and any aspect can be changed or removed just as additional steps or decisions can be added. For example, additional steps may install a support beam that connects left and right support rails so that both rails slide as a singular unit when no data storage device contacts either support rail.

By configuring a drive support slot and rail with positive stop features in accordance with various embodiments, installation of a data storage device can be more safely and securely conducted compared to device carriers that provide no positive stops. The ability to customize the size and position of the tabs and protrusions of a support slot and rail allows a data storage device to be maintained in a predetermined movement range that protects the underlying electrical connectors as well as preventing the device from inadvertently being removed from the drive support.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a rail having a rail width and first and second protrusions offset from one another and each having protrusion widths less than the rail width, the first protrusion having a capture post shaped to connect to a data storage device, the second protrusion shaped to retain the rail in an enclosure slot, the rail having a retention post cantilevered from opposite sides of the rail along a direction parallel to the rail width.

2. The apparatus of claim 1, wherein a plurality of separate data storage devices are concurrently positioned in separate enclosure slots.

3. The apparatus of claim 1, wherein the rail has a notch shaped to accommodate a tab of the enclosure slot.

4. The apparatus of claim 1, wherein the first protrusion attaches to the data storage device via an attachment post secured in an aperture of the data storage device.

5. The apparatus of claim 1, wherein the retention post is cantilevered from an end of the rail proximal a connector of an enclosure circuit board.

6. The apparatus of claim 1, wherein the retention post has a post width that is greater than the rail width.

7. The apparatus of claim 1, wherein the second protrusion contacts a first tab of the enclosure slot when a majority of the rail is removed from the enclosure slot.

8. The apparatus of claim 7, wherein the first protrusion contacts a second tab of the enclosure slot when the data storage device is greater than 0 mm and less than 10 mm from an electrical connector.

9. The apparatus of claim 1, wherein the rail has a latch feature that secures the rail within the enclosure slot.

10. A system comprising:
- a data storage device physically connected between first and second rails, each rail having a rail width and first and second protrusions offset from one another, each protrusion having a protrusion width less than the rail width, the first protrusion having a capture post shaped to connect to the data storage device, each rail having a retention post cantilevered from opposite sides of the respective rails and extending perpendicular to the capture post;
- first and second enclosure drive supports each having first and second slots, each slot having a channel shaped to retain one of the respective rails with the second protrusion of the respective rails, the first and second rails collectively occupying the first slot of the first and second enclosure drive supports; and
- a cooling device physically connected between third and fourth rails, the cooling device separated from the data storage device and occupying the second slot.

11. The system of claim 10, wherein the first and second channels each continuously extend from an entrance region on a front surface of each rail to a position proximal a top surface of each rail, the front and top surfaces of each rail being perpendicular to one another.

12. The system of claim 10, wherein each channel is separated from the top surface and from the front surface except for the entrance region.

13. The system of claim 10, wherein the first and second rails are separate until attached to the data storage device.

14. The system of claim 10, wherein an enclosure slot is defined by the respective first slots of the first and second enclosure drive supports, the first slots of the enclosure drive supports facing each other and concurrently retaining a plurality of different rails.

15. The system of claim 10, wherein the data storage device is electrically connected to a circuit board via a connector aligned with the first enclosure slot.

16. The system of claim 10, wherein each rail resides in first and second portions of the respective enclosure channels.

17. A method comprising:
- inserting a retention post of a rail into an enclosure slot, the rail having a rail width;
- attaching a data storage device to a first protrusion of the rail;
- restricting movement of the rail within the enclosure slot with a second protrusion of the rail, the first and second protrusions being offset from one another and each having a smaller width than the rail width, the rail retained in the enclosure slot by a retention post cantilevered from opposite sides of the rail along a direction parallel to the rail width; and
- establishing an electrical connection between the data storage device and a connector while the rail is retained in the enclosure slot.

18. The method of claim 17, wherein the rail is rotated towards the enclosure slot to position the rail within a channel of the enclosure slot.

19. The method of claim 17, wherein a third protrusion of the rail contacts a first tab of the enclosure slot as a positive stop to prevent the rail from being removed from the enclosure slot in response to the rail being lifted along a direction orthogonal to the rail width.

20. The method of claim 19, wherein the second protrusion contacts a second tab of the enclosure slot as a positive stop to prevent the data storage device from contacting a bottom surface of the connector.

* * * * *